Figure 1:
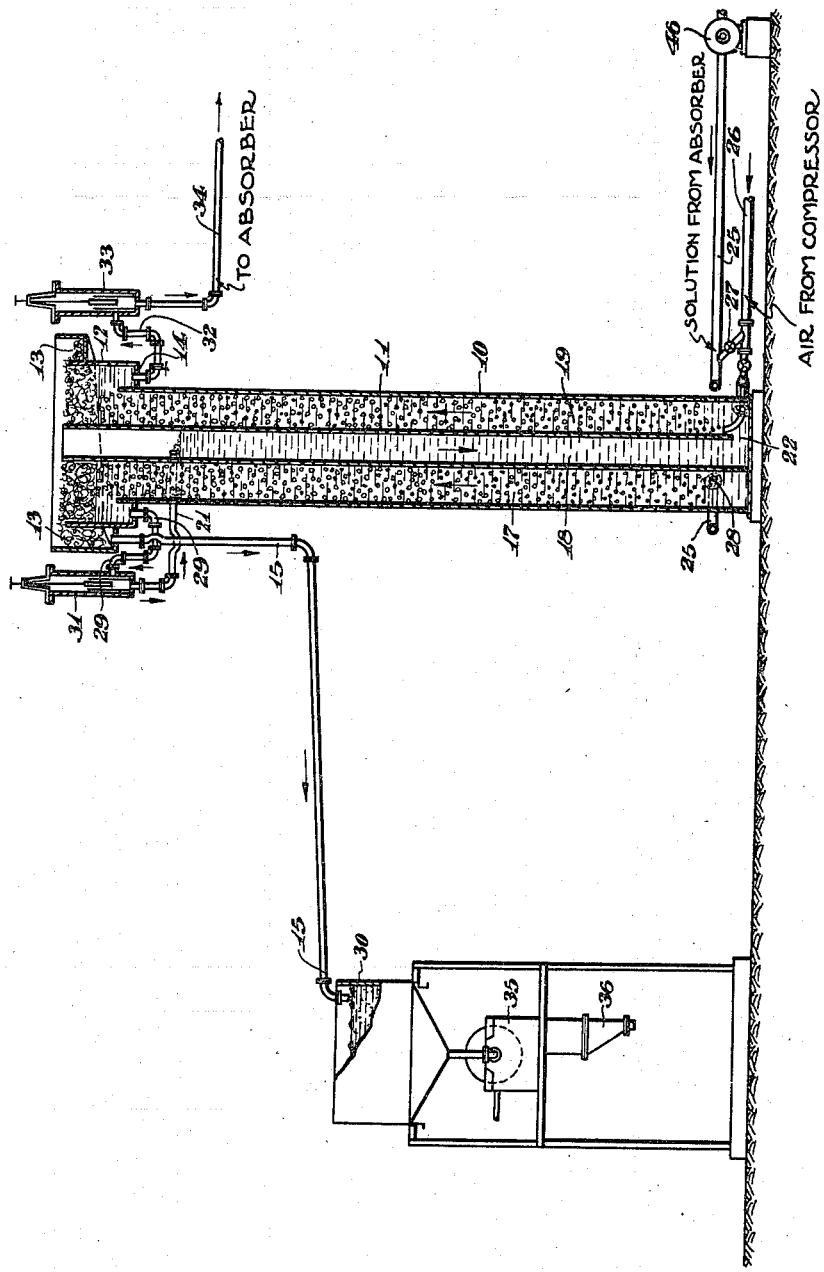

July 26, 1938.  F. DENIG ET AL  2,125,190

GAS AND LIQUID CONTACT APPARATUS AND METHOD

Filed Nov. 21, 1935  2 Sheets-Sheet 1

INVENTORS.
FRED DENIG
HERBERT A. GOLLMAR.
BY
ATTORNEY

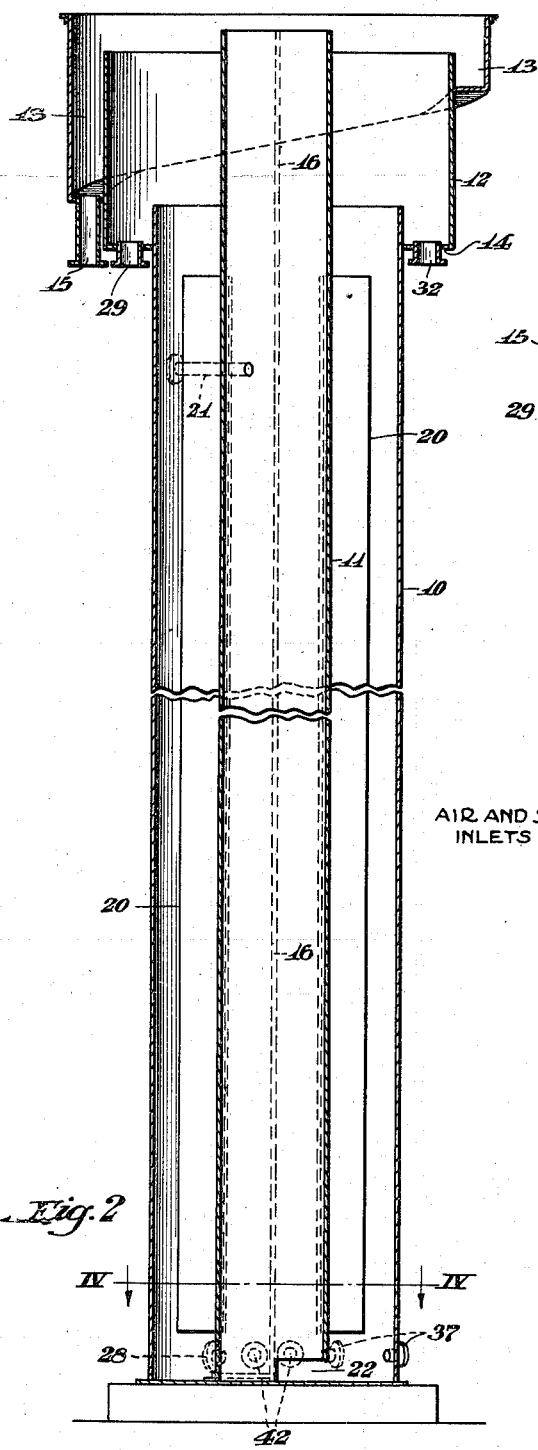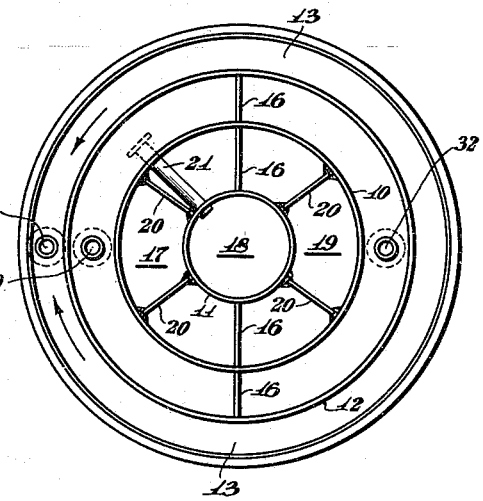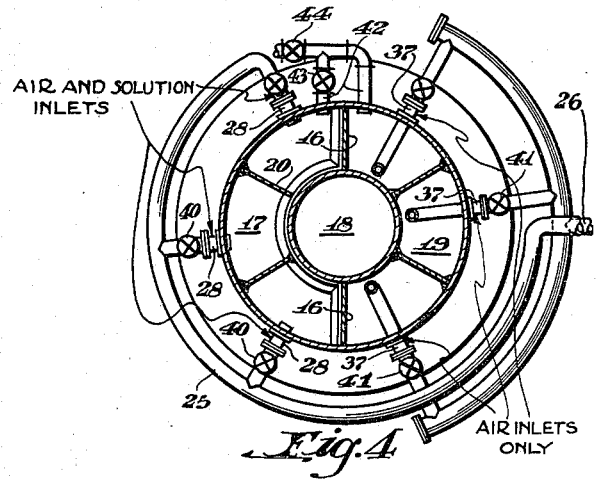

Patented July 26, 1938

2,125,190

UNITED STATES PATENT OFFICE 2,125,190

GAS AND LIQUID CONTACT APPARATUS AND METHOD

Fred Denig, Pittsburgh, Pa., and Herbert A. Gollmar, Union, N. J., assignors, by mesne assignments, to Koppers Company, a corporation of Delaware Application November 21, 1935, Serial No. 50,820

4 Claims. (Cl. 23—225)

Our present invention relates to an improved design of apparatus for a gas and liquid contact tower and pertains more especially to a tower of the type adapted to contain a liquid body through which a gas or gaseous mixture may be passed. Our invention may be used as an absorber or more particularly as a so-called "actifier" wherein absorbing solutions, such as have been fouled in a so-called liquid purification process for the removal of hydrogen sulphide, hydrogen cyanide and other undesirable constituents from gases, may be regenerated and substantially restored to their original reactivity by bringing said solutions into intimate contact with air.

The instant invention lends itself more especially to employment in the practice of such processes as comprise: an absorption step, wherein an aqueous solution or an aqueous solution carrying a suspensoid is intimately brought into contact with a gaseous mixture for the removal of a preferred constituent or constituents from said gaseous mixture, and during which step the absorbing ability of the solution or the solution-suspensoid mixture for that preferred constituent, is reduced; a regeneration step following the absorption step, wherein the absorbing ability of the solution or its suspension is substantially restored by bringing the solution of reduced activity into intimate contact with a gaseous mixture which removes the substance effecting the reduced activity of the absorbing solution or alters said substance to such form that it no longer influences materially the absorbing capacity of the solution for the preferred constituents of the gaseous mixture treated in the first step; following which, in a third step, the regenerated solution is recirculated to the absorption step.

The apparatus of our instant invention comprises an improved form of a solution regenerating apparatus adapted to recover materials segregated, at the top of the regeneration tower, by the gas or gaseous mixture forced through the regenerating solution to effect its regeneration, said segregation being brought about by bubbles of the excess gas or gases escaping from the surface of the solution during that period.

In those liquid purification processes designed to provide a method of recovering, in the form of elemental sulphur, the hydrogen sulphide removed from the treated gases by the absorption solution, an oxidation reaction is involved whereby the hydrogen sulphide or derivatives thereof are partially oxidized to that element.

Atmospheric oxygen is, in general, used to promote the oxidation reaction, and for this purpose, in certain instances, air is forced into the fouled solution after it flows from the absorber, where the treated gas and absorbing solution have been brought into intimate contact, and under such conditions as to liberate sulphur in the elemental form. The sulphur thereby liberated from its combinations appears in the recirculated scrubbing solution as a finely divided suspension which collects on the solution surface and may be removed by any suitable means.

Operating economy is promoted by making effective use of any air passed through the fouled solution. The degree to which a definite quantity of air is utilized depends, amongst other factors, on time of contact, pressure of the air flowing through the solution and the degree of saturation of the fouled solution in respect of the oxygen component of the air. By retaining the solution undergoing regeneration in high towers during the regeneration period, longer contact between the solution and air is provided than results in regenerating structures offering less solution depth; and in consequence of the pressure head exerted by the height of the solution, the air flowing through the regenerating tower is under a correspondingly higher pressure than atmospheric and so provides increased opportunity for oxygen absorption and retention in the processing solution. As previously mentioned, the efficiency of oxygen absorption and, consequently, the efficiency of air utilization, also depends on the degree to which the solution is already saturated with oxygen; and it is obvious, that the flowing of oxygen bearing air through a solution approaching oxygen saturation and, consequently, of reduced absorbing ability therefor, constitutes an economic disadvantage to a process using this method of solution regeneration.

We have determined, experimentally, that the step involving the physical absorption of oxygen into the fouled solution progresses more rapidly than the absorbed oxygen is removed from the solution by its chemical reaction with the solution-borne sulphur compounds. In other words, an appreciable interval or time-lag exists between the point when saturation of the solution in respect of oxygen is effected and the time when such absorbed oxygen can be consumed by the sulphur bearing constituents. It is apparent, therefore, from these observations, that continuous flowing of air through the regenerating solution after the oxygen saturation point is substantially reached, constitutes an uneconomic practice and that a step-wise introduction of air into the regenerating solution in such manner that an aeration period, during which the solution is quickly brought to a point where a close approach to saturation with oxygen is effected, followed by a period of no aeration, during which interval, time is allowed for the absorbed oxygen to react with the sulphur constituents of the solution, thereby reducing the oxygen content of the solution, and insuring it a high absorptive capacity for oxygen during a subsequent aeration period, will be attended by an increased oxygen absorption from a given quantity of air subsequently introduced and so provide an improved air utilization, with consequent reduction in energy costs for its compression.

Among the objects of our invention, therefore, is the provision of a simple and effective unit apparatus whereby solutions flowing therethrough may be intermittently subjected to gas treating steps, and intermediate the gas treating steps be provided with a period of quiescence in respect of gas flow. In consequence of aforementioned facts, an apparatus providing such conditions finds special application in the regeneration of fouled solutions flowing from the absorbers of liquid purification processes, and more especially in those processes where an objective is the recovery of sulphur in elemental form from derivatives thereof carried in the fouled solution, by providing means for obtaining improved efficiency of oxygen removal from air forced through the fouled solution for regenerating purposes. The invention has for further objects such other improvements and such other operative advantages or results as may be found to obtain in the processes or apparatus hereinafter described or claimed.

In the accompanying drawings forming a part of this specification and showing for purposes of exemplification a preferred apparatus and method in which the invention may be embodied and practised but without limiting the claimed invention specifically to such illustrative instance or instances, Figure 1 shows a vertical sectional elevation of a gas and liquid contact tower built in accordance with the improvements of our present invention and in combination with a sulphur removal and filtering means whereby the elemental sulphur produced in our invention may be recovered and partially dried; and Figure 2 is an enlarged view of the solution regenerating tower and shows the internal arrangement of the vanes serving to support the inner tower section in proper alignment, said vanes also functioning to prevent surging of the solution in the outer solution sections.

Figure 3 is a plan of Figure 2; and
Figure 4 is a section taken along the line IV—IV of Figure 2.

The same characters of reference designate the same parts in each of the views of the drawings.

Referring now to the drawings, particularly to Figures 1 and 2, the body of the solution regeneration or oxidation tower of our invention comprises, essentially, two concentrically disposed annular pipes 10, 11, of different diameter, their common axis extending vertically. The outside pipe 10 of the larger diameter opens at its upper end into a short header pipe 12 of still greater diameter which is concentrically affixed to pipe 10 by means of a ring-plate 14 to which nozzles for solution distribution are secured. The header pipe 12, which stands in direct communication for fluid flow with the ring-shaped column of liquid supported in the interspace of pipes 10 and 11, serves a two-fold purpose; it functions both as a liquid distributor and as a skimming tank for such materials as may rise to the surface of fluids flowing through said interspace. The circular trough 13 collects materials decanted over the upper edge of 12 and is provided with an inclined bottom for promoting the removal of such decanted materials into the storage hopper 30 through the connecting pipe 15.

The interspaces of the pipes 10, 11, and 12 are divided into two substantially equal sections by the vertically extending wall 16, situated on those parts of the diameters of pipes 10 and 12 that lie within said interspaces. The regeneration tower is in this manner divided into three separate sections 17, 18 and 19 for fluid flow.

The vanes 20 function as additional supporting means to maintain 10, 11 in proper alignment and to prevent extensive surging in the liquid columns when air is being forced upwards through them. They further provide for effecting efficient distribution and contact between the gases and liquid flowing concurrently through the tower. Said supporting or directing vanes may be only tack-welded to pipes 10 and 11, if preferred, so that solution flow between the vane-formed sectors, within an interspace half segregated by the division wall 16, is not entirely precluded, thus facilitating maintenance of a similar solution level in such sectors.

The pipe 21 provides means for conveying solution from tower section 17 into section 18 formed by the pipe 11; through orifice 22 provided at the lower end of 11, solution from section 18 flows into section 19.

Fouled absorption solution bearing hydrogen sulphide or derivatives thereof passes from a gas purification absorber through line 25 by means of pump 46 into section 17 of the tower body. Simultaneously, air forced through the pipe 26 at the required pressure head is allowed to flow in preferred quantities through the valve 27, in the branch line interconnecting lines 25, 26, and into the fouled solution line 25. Intimate contact is thereby established between air and solution before they enter the regenerating tower through check-valves 40 and nozzles 28 at the bottom of section 17. The fouled solution, carrying air finely distributed through it, flows upwards, as indicated by the arrow, absorbing oxygen in its transit.

The fouled solution soon approaches saturation with oxygen and the air, in excess of that absorbed by the solution, bubbles therethrough and rises to the top of the section 17 whence it escapes into the atmosphere. The absorbed oxygen retained in the solution reacts with hydrogen sulphide or its derivatives to liberate elemental sulphur, which being insoluble in the absorption solution, appears as a fine suspensoid and floats to the surface of the solution in said section, where it accumulates as a voluminous spume or foam in consequence of a large volume of entrained air. As this spume increases in volume, it spills over the edge of the decanter header 12 and into the sulphur trough 13, and when sufficient head is reached, sinks through the line 15 to the storage hopper 30.

A partial regeneration of the fouled solution has been effected in this first pass through a section of the regenerating tower. As before-mentioned, however, the oxidation reaction to liberate sulphur progresses more slowly than the absorption of oxygen into the solution for that purpose, and following this first pass, sufficient of previously absorbed oxygen still remains in the solution for effective oxidation without making available a new supply source.

According to the present invention, therefore, consideration is given this lag between relatively rapid oxygen absorption into the solution and its slower consumption in the oxidation reaction to produce sulphur. In our process of regenerating a fouled gas purification solution, therefore, a period of no aeration, between aeration steps, is provided during which oxygen already available in the solution for oxidation purposes, following a prior aeration step, is taken advantage of to continue promoting the sulphur oxidation reaction, thereby simultaneously reducing significantly the oxygen reserve therein and so decreasing the oxygen vapor pressure in the solution that, as it emerges from this non-aeration step, the absorption solution has an enhanced oxygen absorptive capacity over that obtaining at the beginning of the step and a consequently improved ability to remove oxygen from new quantities of air forced through it. The course of the oxidation reaction to produce elemental sulphur has, therefore, not been significantly retarded and an economic advantage is realized, by introducing air into the solution only during such periods as its oxygen absorbing ability is high.

Referring again to the drawings, showing an embodiment of an apparatus wherein such method of air introduction may be carried out, the processing solution, after its first pass upwards through section 17 of the regenerating tower and the removal of a proportion of the elemental sulphur produced during the oxidation, as previously described, flows through the pipe 29 into a device 31 for regulating the solution level in the tower section 17, and thence, through line 21 into the center section 18 formed by the pipe 11. Within this section, the solution flows quietly downward without treatment by air, as indicated by the difference in solution levels between the two outside and central sections. Arriving at the lower end of tower section 18, the solution, now having an improved oxygen absorbing capacity, flows through the orifice 22 in pipe 11 and into tower section 19, where it is brought into contact with a new quantity of air, introduced therein from pipe 26 and through check-valves 41 and nozzles 37 into the sectors formed by supporting and directing vanes 20 of that section. The air and solution rise concurrently through section 19, a new supply of oxygen being absorbed by the solution to effect the further liberation and segregation of elemental sulphur from the solution. The sulphur liberated in sections 18, 19 is carried to the top of the latter section and assumes the form of a sulphur spume by the action of the unabsorbed air flowing out of that section and is carried over the edge of the decanter header 12, when its volume reaches sufficient proportions, to spill into sulphur trough 13 and pass down the inclined bottom of said trough and mix with sulphur spume decanted from section 17; the mixture then passes to the collecting hopper 30.

The so processed solution or solution-suspensoid mixture with its absorbing capacity for the preferred constituents of a gaseous mixture, as for example hydrogen sulphide and hydrogen cyanide present in coking retort oven gas, now substantially restored, flows through pipe 32 and solution level regulator 33, to be returned to the gas treating absorber through pipe 34.

Pipes 42 provide means for draining the various sections of the regenerating tower when the valves 43, 44 are open. When filling the empty tower with liquid, valve 44 is closed and valve 43 is allowed to remain open, thereby establishing communication between the various tower sections 17, 18, 19, so as to obviate pressure inequalities between the sections that would be otherwise created. During operation, valve 43 is closed to prevent the short circuiting of liquid between the sections.

The sulphur bearing spume or slurry, containing amongst other ingredients a high percentage of absorption solution, is flowed from the collecting hopper 30 into filter 35, where most of said absorption solution is removed by filtration and the moist solids dumped into receptacle 36 to be optionally disposed of. The separated absorption solution is returned to the process or discarded as preferred.

In the aforegiven specification, we have disclosed a new and improved method of bringing a gas and liquid into contact, which is more especially adapted to processes including a step involving a reaction between a gas and liquid-borne substances and, in which step, an excess of the gas is forced through the liquid for the purpose of segregating at the surface thereof, reaction products of the gas with said substances carried by the liquid. In those instances where said reaction products are slowly formed in respect of the rate at which the gas is dissolved into the liquid for reaction purposes, it is obvious, that continued forcing of excess gas through the processing liquid, after near saturation is effected and when only small amounts of reaction products are present to be segregated at the surface, is an uneconomic procedure and that operating economies will result from forcing the gas through said liquid only at such times as a significant amount of reaction products have been formed and the gas absorbing capacity of the liquid is relatively high.

In our method, therefore, of bringing a gas and liquid into contact for the aforedescribed purpose, we intermittently introduce the required gas into the processing liquid in quantities sufficient to produce near saturation and isolate the reaction products at the surface and, intermediate such periods of gas treatment, provide intervals of no treatment, during which the quantity of gas absorbed by the liquid in a preceding step is allowed to react with the liquid-borne substances, thereby reducing the concentration of the gas in said liquid, and enabling it to enter the subsequent gas treating period with enhanced gas absorbing capacity. The reaction products, formed during the intervals of no gas contact are segregated at the liquid surface during the following gas treating interval.

The structure herein disclosed provides a simple and effective apparatus for practising our method of bringing a solution or solution-suspensoid mixture into contact with a gas for the objectives previously cited. The structural integrity and compactness thereof, especially adapt it for use in the frequently limited available ground space of industrial plants and it has an important application in practising gas purification according to those processes involving the oxidation, to elemental sulphur, of hydrogen sulphide derivatives carried either in solution or suspension in liquid media.

Our invention as hereinabove set forth is embodied in particular form and manner but may be variously embodied within the scope of the claims hereinafter made.

We claim:

1. A unit apparatus for regenerating fouled solution discharged from the absorber of a process for the liquid purification of gas comprising, in combination: a tower with a bottom; within said tower an upright conduit of relatively great height in comparison to breadth coaxially disposed to form a ring-like interspace of relatively great height in comparison to breadth between the tower and the conduit, said ring-like interspace being divided into two parts by a division wall extending vertically along that portion of the tower diameter within the interspace; said conduit being connected at its upper part with the upper portion of an initial interspace part to pass liquid from the upper portion of the interspace part downwardly through the conduit, and said conduit being connected at its lower part with the lower part of the remaining interspace part to pass liquid from the bottom of the bottom conduit upwardly through the remaining interspace part; means for introducing solution into the bottom of the initial interspace part and for raising the solution upwardly therein under hydraulic pressure to the upper part of the initial interspace part; means for introducing air into the bottom of each section of the ring like interspace; means for decanting and separating at the top of the tower materials segregated from the solution by the air; and outlet means from the upper portion of the remaining interspace part at substantially the same elevation as the outlet from the initial interspace part.

2. Unit apparatus for regenerating liquid comprising, in combination: a single tower having partitions therein forming an inlet gas and liquid up-flow chamber, a connecting liquid down-flow gas by-pass chamber, and an outlet gas and liquid up-flow chamber, with one of the chambers having a partition in common with each of the other chambers and with each chamber of relatively great height in comparison to breadth but of such breadth as to require hydraulic pressure for effecting the up-flow of liquid therein, the connecting liquid down-flow gas by-pass chamber being connected at its upper part with the inlet gas and liquid up-flow chamber at its upper part to receive and pass overflow liquid therefrom downwardly in the connecting chamber and said connecting gas by-pass chamber communicating at its lower part with the gas and liquid outlet up-flow chamber at its lower part to pass liquid from the lower part of the connecting chamber into the lower part of the outlet chamber upwardly therethrough; means for introducing liquid into the lower part of the inlet gas and liquid up-flow chamber and adapted to impart hydraulic pressure to the liquid being introduced in such manner as to effect the main upward flow in the chamber by such applied hydraulic pressure means for separately introducing gas into the lower part of each of the gas and liquid up-flow chambers, said gas inlet means by-passing the down-flow chamber and being so adapted to introduce the gas that the gas may bubble slowly through the liquid in the up-flow chambers during up-flow of the liquid under the hydraulic head of the inlet up-flow chamber; outlet means for the liquid at the upper part of the gas and liquid outlet up-flow chamber at substantially the same elevation as the outlet at the upper part of the inlet gas and liquid up-flow chamber; and means for decanting at the upper part of the outlet gas and liquid up-flow chamber materials segregated from the liquid therein by the regenerating air.

3. A process for the regeneration of wash-liquids that have served for the separation of hydrogen sulphide from gases, comprising: maintaining the wash-liquid in a continuously flowing stream of successively upwardly and downwardly flowing flow-columns that are of substantially like volume and pressure-head and that are each of large cross-section in proportion to their height, effecting the maintenance of such flow by hydraulic pressure of the wash-liquid forced into the foot of the initial column of such succession of flow-columns, introducing at the foot of each of only the up-flowing flow-columns the air for effecting the regeneration of such wash-liquid, proportioning the amount and pressure of such introduced air so that it bubbles through the up-flowing columns in sufficient amount to provide the aeration required for regeneration of the wash-liquid and at the same time is so finely dispersed through the liquid as to avoid agitation of the upwardly flowing liquid column and promote flotation of the liberated sulphur by the entrainment of the sulphur particles in the particulate air bubbles that quiescently rise to form the sulphur-bearing foam gathering at the top of the column, providing quiescent down-flow of the wash-liquid overflowing into the down-flow column so that there may be substantial time-lag for regenerative reaction of the surplus oxygen absorbed by the liquid from the air bubbles in the preceding up-flow column of its flow-path, and the regeneration being completed in an up-flowing column whose up-flow is maintained by the liquid pressure-head in the preceding down-flow column and that is aerated by air introduced at the foot of such up-flow column under regulation in like manner as for the preceding up-flow column; the proportioning of the large cross-section of the several columns in respect of their height being such that the hydraulic pressure impressed into the foot of the initial up-flowing column and the liquid pressure-head of the consequent overflow down-flow column dominate the flow of the liquid throughout its entire extended flow-path, and the air introduced at the foot of the up-flow columns being so proportioned as to serve the purposes of the regenerative aeration and the sulphur flotation with only such excess as may be incidental to those purposes and avoid disturbance of the quiescent flow impelled by the initial hydraulic pressure and the further liquid pressure-head.

4. Apparatus as claimed in claim 1, and in which the liquid outlets for the upflow-compartments are disposed at an elevation above the liquid inlet to the connecting-compartment sufficient to accommodate the rise of the columns of liquid in the up-flow compartments by the levitating action of the aeration gas but insufficient to prevent the major portion of the rise of the liquid columns by hydraulic pressure of the columns.

FRED DENIG.
HERBERT A. GOLLMAR.